(12) United States Patent
Kim et al.

(10) Patent No.: US 12,438,489 B2
(45) Date of Patent: Oct. 7, 2025

(54) COMMON MODE NOISE CANCELLING ELECTRIC MOTOR SYSTEM

(71) Applicant: GM Global Technology Operations LLC, Detroit, MI (US)

(72) Inventors: Junghoon Kim, Ann Arbor, MI (US); Muhammad Hussain Alvi, Troy, MI (US); Mohammad F. Momen, Rochester Hills, MI (US); Yilun Luo, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 218 days.

(21) Appl. No.: 18/330,444

(22) Filed: Jun. 7, 2023

(65) Prior Publication Data

US 2024/0413777 A1 Dec. 12, 2024

(51) Int. Cl.
*H02P 25/22* (2006.01)
*H02M 1/00* (2006.01)
*H02M 7/48* (2007.01)
*H02P 27/06* (2006.01)
*H02M 1/14* (2006.01)
*H02P 101/45* (2016.01)

(52) U.S. Cl.
CPC .......... *H02P 27/06* (2013.01); *H02M 1/0009* (2021.05); *H02M 7/48* (2013.01); *H02M 1/14* (2013.01); *H02P 2101/45* (2015.01)

(58) Field of Classification Search
CPC ...... H02P 27/06; H02P 2101/45; H02P 25/22; H02M 1/0009; H02M 7/48; H02M 1/14; H02M 1/123; H02M 7/5387; H02K 11/33
See application file for complete search history.

(56) References Cited

U.S. PATENT DOCUMENTS

| 12,003,201 B2* | 6/2024 | Wende | B60W 10/08 |
| 2017/0359008 A1* | 12/2017 | Kano | H02P 29/64 |
| 2020/0366232 A1* | 11/2020 | Kinjo | H02P 25/18 |

\* cited by examiner

*Primary Examiner* — Muhammad S Islam
(74) *Attorney, Agent, or Firm* — CANTOR COLBURN LLP

(57) ABSTRACT

An electric motor configuration includes a dual output multilevel inverter. The inverter includes a first and second set of alternating current (AC) phase outputs. The first set of AC phase outputs provide a current, each phase output of the first set of AC phase outputs corresponds to a phase output of the second set of AC phase outputs, and each phase output of the first set of AC phase outputs is offset from the corresponding phase output of the second set of phase outputs by 180 degrees. An electric motor includes a first and second set of antiparallel motor windings. The first set of motor windings is connected to the first set of AC phase outputs and the second set of motor windings are connected to the second set of AC phase outputs. The electric motor includes a mechanical rotation output.

19 Claims, 4 Drawing Sheets

COMMON MODE NOISE CANCELLING ELECTRIC MOTOR SYSTEM

INTRODUCTION

The subject disclosure relates to electric motor configurations, and more specifically to an electric motor system utilizing a dual output multiphase inverter to drive a single electric motor.

Electric and hybrid vehicles utilize stored electric energy to drive rotation of electric motors, with the rotation from the motors being provided to the mechanical systems of the vehicle. In most cases, the stored electric energy is provided in direct current (DC) form, and the electric motor requires alternating current (AC) to properly function. When this is the case, an inverter is utilized to convert the DC power output from the energy storage device to an AC power output that can be utilized by the electric motor. The power characteristics of the AC power output are typically controlled via switching rates within the inverter, and the switching rates are in turn controlled via a motor controller according to known feedback control principles. The rate at which switches within the inverter are switched correlates to the amount of common mode noise within the motor driving system, with faster switching resulting in more common mode noise. Excess common mode noise can interfere with motor operations resulting in less efficient or less ideal operations.

As inverter technologies have increased, the maximum switching rate of the inverters has increased resulting in a corresponding increase in potential common mode noise within the electric motor systems. Accordingly, it is desirable to provide a vehicle motor system capable of high switching rates within the inverter and reduced common mode noise.

SUMMARY

In one exemplary embodiment an electric motor configuration includes a dual output multilevel inverter including a first set of alternating current (AC) phase outputs and a second set of multi-phase AC phase outputs with the first set of AC phase outputs providing a current, each phase output of the first set of AC phase outputs corresponding to a phase output of the second set of AC phase outputs, and wherein each phase output of the first set of AC phase outputs is offset from the corresponding phase output of the second set of phase outputs by 180 degrees; and an electric motor including a first set of motor windings and a second set of motor windings configured antiparallel to the first set of motor windings, the first set of motor windings being connected to the first set of AC phase outputs and the second set of motor windings being connected to the second set of AC phase outputs, and wherein the electric motor includes a mechanical rotation output.

In addition to one or more of the features described herein the dual output multilevel inverter is a high speed switching inverter.

In addition to one or more of the features described herein the dual output multilevel inverter is a GaN switch based inverter.

In addition to one or more of the features described herein the electric motor includes a plurality of winding slots corresponding to each phase of the electric motor and wherein each winding slot includes windings from the first set of motor windings and windings from the second set of motor windings.

In addition to one or more of the features described herein wherein windings from the first set of motor windings and from the second set of motor windings in at least a subset of the plurality of winding slots are arranged in radial adjacency.

In addition to one or more of the features described herein windings from the first set of motor windings and windings from the second set of motor windings in at least a subset of the plurality of winding slots are arranged in circumferential adjacency.

In addition to one or more of the features described herein windings from the first set of motor windings and from the second set of motor windings in at least a subset of the plurality of winding slots are arranged in radial adjacency.

In addition to one or more of the features described herein, an electrically insulating sheet is disposed between adjacent portions of the first set of windings and the second set of windings.

In addition to one or more of the features described herein the first set of motor windings includes a first neutral node and the second set of motor windings includes a second neutral node, and wherein the first neutral node is connected to the second neutral node such that the first and second neutral node are electrically connected in at least one mode of operations.

In addition to one or more of the features described herein the first and second neutral nodes are connected via an electrically controlled switch.

In addition to one or more of the features described herein the first neutral node is electrically floating relative to second neutral nodes.

In addition to one or more of the features described herein, a motor controller is communicatively coupled to a plurality of current sensors, each current sensor in the plurality of current sensors being configured to detect a net current magnitude passing through a pair of corresponding phase outputs.

In addition to one or more of the features described herein the plurality of current sensors comprises N−1 Hall effect current sensors, where N is a total number of phases of the electric motor.

In another exemplary embodiment a vehicle includes an electric energy storage system connected to a first electric motor via a first dual output multilevel inverter, wherein the electric energy storage system provides direct current (DC) power to the first dual output multilevel inverter; the first dual output multilevel inverter including a first set of alternating current (AC) phase outputs and a second set of multi-phase AC phase outputs with the first set of AC phase outputs providing a current, each phase output of the first set of AC phase outputs corresponding to a phase output of the second set of AC phase outputs, and wherein each phase output of the first set of AC phase outputs is offset from the corresponding phase output of the second set of phase outputs by 180 degrees; and the first electric motor including a first set of motor windings and a second set of motor windings configured antiparallel to the first set of motor windings, the first set of motor windings being connected to the first set of AC phase outputs and the second set of motor windings being connected to the second set of AC phase outputs, and wherein the electric motor includes a mechanical rotation output.

In addition to one or more of the features described herein the electric motor includes a plurality of winding slots corresponding to each phase of the electric motor and wherein each winding slot includes windings from the first set of motor windings and windings from the second set of motor windings.

In addition to one or more of the features described herein windings from the first set of motor windings and from the second set of motor windings in at least a subset of the plurality of winding slots are arranged in radial adjacency.

In addition to one or more of the features described herein windings from the first set of motor windings and windings from the second set of motor windings in at least a subset of the plurality of winding slots are arranged in circumferential adjacency.

In addition to one or more of the features described herein windings from the first set of motor windings and from the second set of motor windings in at least a subset of the plurality of winding slots are arranged in radial adjacency.

In addition to one or more of the features described herein an electrically insulating sheet disposed between adjacent portions of the first set of windings and the second set of windings.

In yet another exemplary embodiment a method of operating an electric motor includes: providing a direct current (DC) power output from an energy storage system to a multilevel dual output inverter, converting the DC power to a first set of alternating current phase outputs and a second set of alternating current phase outputs using the multilevel dual output inverter, wherein the first set of alternating current phase outputs includes a first plurality of phases, the second set of alternating current phase outputs includes a second plurality of phases, each phase in the first set of phase outputs corresponds with a phase in the second set of phase outputs, and each phase is offset from the corresponding phase by 180 degrees, providing the first and second alternating current phase outputs to a single electric motor, and passing current from each phase of the first set of alternating current phase outputs through a first set of motor windings and passing current from each phase of the second set of alternating current phase outputs through a second set of motor windings, wherein the first set of motor windings is arranged in antiparallel to the second set of motor windings, thereby generating a rotational output from the electric motor.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
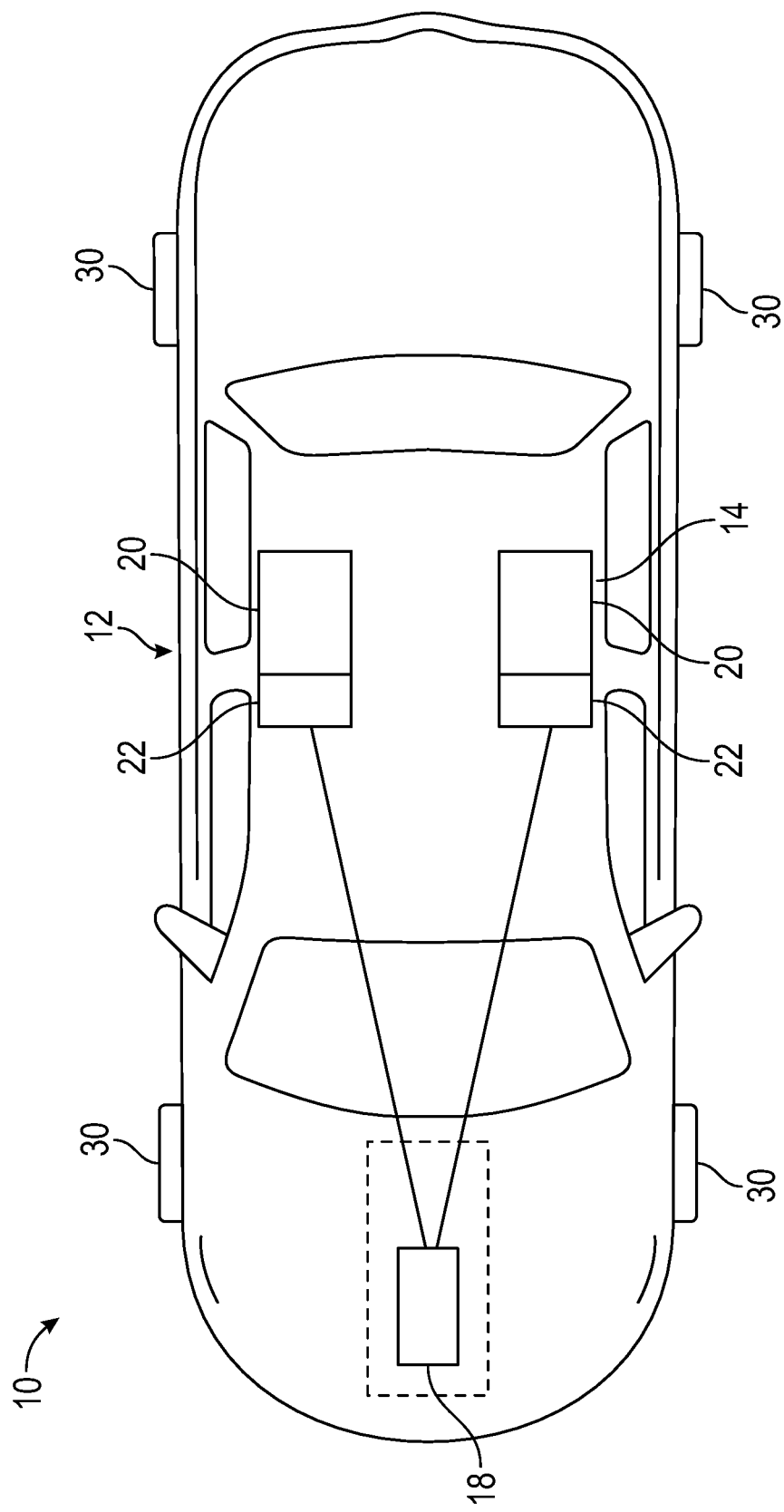
FIG. 1 schematically illustrates a vehicle including an electric motor according to an example embodiment.

The following description is merely exemplary in nature and is not intended to limit the present disclosure, its application or uses. It should be understood that throughout the drawings, corresponding reference numerals indicate like or corresponding parts and features. As used herein, the term controller refers to any electronic device configured to receive one or more inputs and generate an output capable of controlling one or more other systems based at least in part on the received input(s), including processors, field programmable gate arrays (FPGAs), microcomputers, hardware controllers and the like.

In accordance with an exemplary embodiment FIG. 1 schematically illustrates a vehicle 10 having a body 12 defining at least a passenger compartment 14. The vehicle 10 includes an electric energy storage system 18, such as a battery. The energy storage system 18 provides power to one or more motors 20 through corresponding inverters 22. The motors convert the electrical energy into mechanical rotation, and the mechanical rotation is provided to vehicle systems such as wheels 30, or other drive system components.

Figure 2:
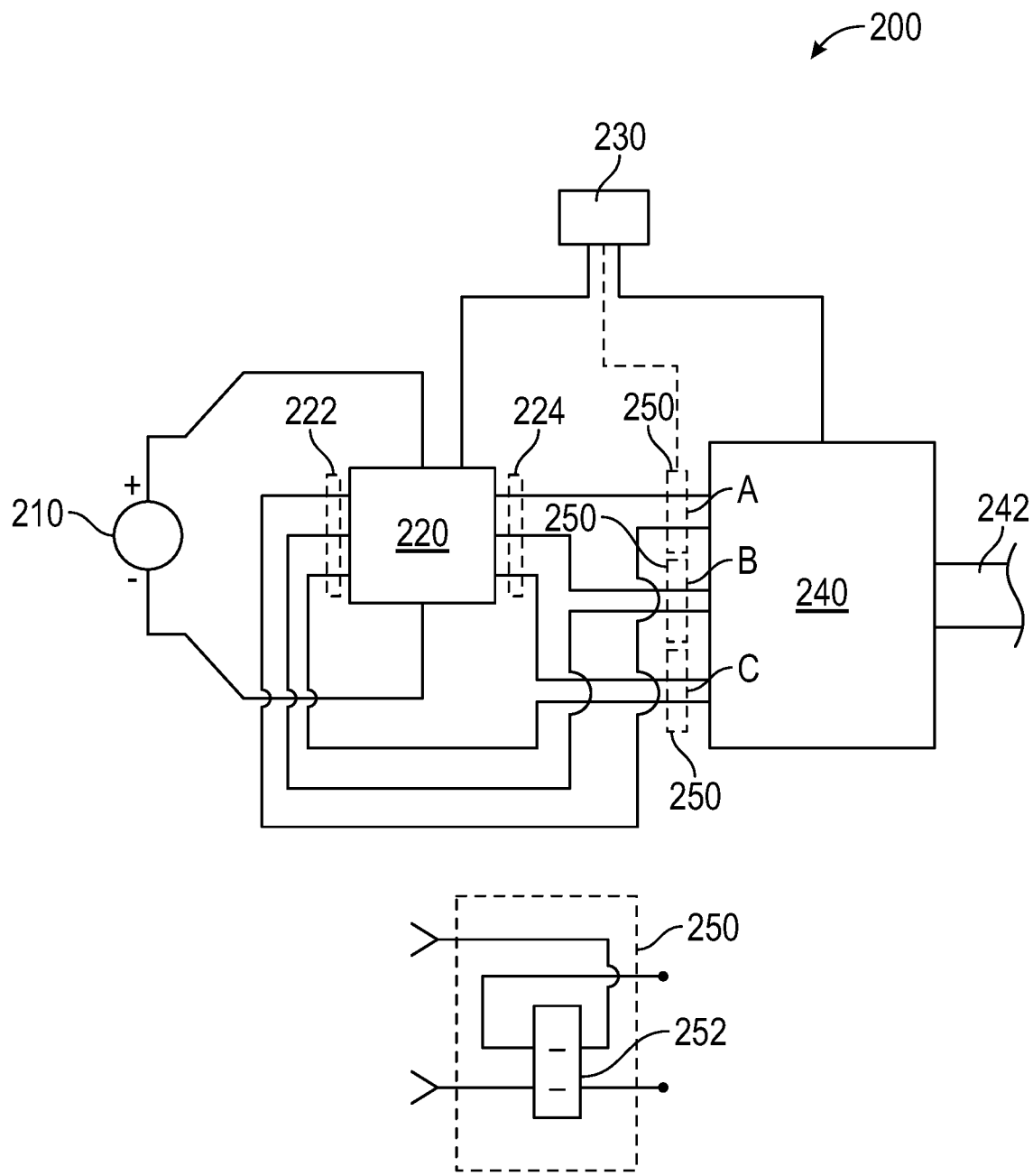
FIG. 2 schematically illustrates a vehicle system for using stored electrical energy to generate rotational force within the vehicle of FIG. 1.

With continued reference to the vehicle 10 of FIG. 1, FIG. 2 schematically illustrates a vehicle system 200 for using stored electrical energy to generate rotational force within the vehicle of FIG. 1. The vehicle system 200 includes a direct current (DC) stored electrical energy source 210 (such as the electric energy storage system 18 of FIG. 1). The DC stored electrical energy source 210 is connected to a DC/alternating current (AC) inverter 220, and the inverter 220 converts the DC energy to three phase AC energy.

The inverter 220 is a dual output multiphase inverter, and has a first set of phase outputs 222 and a second set of phase outputs 224. The illustrated example inverter 220 is a three phase inverter, meaning that each set of phase outputs 222, 224 includes three phases (commonly referred to as A, B, C). Each phase of each phase output 222, 224 is a sine wave output, or an approximation of a sine wave output, and is offset from each other phase output 222, 224 in the same set of phase outputs 222, 224. In one example, the switches making up the dual output multiphase inverter 220 are configured in either an H-type inverter topology or an X-type inverter topology. Alternatively, the switches in the dual output multiphase inverter 220 can be in any dual output multiphase inverter topology and switching operations are controlled via a controller 230. The controller 230 can be a dedicated motor controller, a general purpose vehicle controller, or any similar control system.

The switches within the dual output multiphase inverter 220 are capable of operating at a fast switching speed. As used herein, a fast switching speed refers to inverter switches capable of switching at a rate in excess of 10 kV/us. In one specific example, the switches providing the fast switching speed are gallium nitride (GaN) based switches.

By having a synchronized and complementary switching scheme between dual inverters, the phase outputs of the first set of phase outputs 222 and the phase outputs of the second set of phase outputs 224 are offset from each other by 180 degrees. As such, the "A" phase output of the first set of phase outputs 222 and the "A" phase output of the second set of phase outputs are 180 degree offset sine waves and cancel common mode voltage as well as each other output currents if added together. Similarly, both the "B" phase outputs and the "C" phase outputs will cancel the corresponding phase output from the other set of phase outputs 222, 224. Providing both outputs of any given phase (A, B, C) to a conventional motor construction results in a non-operational phase, and therefore a non-operational motor.

Both sets of phase outputs 222, 224 are provided to a single electric motor 240. The electric motor 240 includes internal sensors according to conventional electric motor sensing arrangements, and the sensors are in communication with a motor controller 230. The motor controller 230 utilizes the sensor readings to control the dual output multilevel inverter 220, and thereby control operations of the motor 240 according to known motor control techniques.

The electric motor 240 converts AC power inputs into mechanical rotation and outputs the mechanical rotation via a mechanical rotational output 242. The mechanical rotational output 242 can then be provided to any number of vehicle systems, such as the wheels 30, that utilize mechanical rotation. In order to allow for both sets of phase outputs 222, 224 to be utilized together within single electric motor 240, each phase (A, B, C) includes two distinct sets of phase windings, with the first set of windings being connected to the first set of phase outputs 222, and the second set of windings being connected to the second set of phase outputs 224. The first set of phase outputs 222 is oriented in antiparallel with the second set of phase outputs 224 (see FIGS. 3 and 4). As used herein, antiparallel refers to a construction where the windings or other electrical elements are physically in parallel, and current flows through the windings or other electrical elements in opposing directions.

In addition to internal sensors within the motor 240, current sensors 250 are positioned at the phase inputs to the motor 240, with each set of phases A, B, C including a single corresponding current sensor 250. As can be seen in the zoomed illustration of a single phase of the current sensor 250 in FIG. 2, one physical magnetic field sensor 252 can sense a combined total input for a given phase by passing the input from the first set of phase output currents and the input from the second set of phase output currents through the magnetic field sensor 252 in antiparallel. Using this configuration, the net current entering the motor 240 can be sensed using N current sensors, where N is the total number of phases in each set of phase outputs 222, 224, rather than 2*N current sensors required to sense each input individually.

In yet another example (not shown), one of the current sensors 250 can be omitted, and the total instantaneous current through the input with no current sensor can be calculated by the controller 230 using the known principle that the total current output from the inverter across all three phases is 0, and therefore knowledge of the net current through N−1 phases will provide sufficient information to calculate the Nth phase, despite a lack of direct measurement. In such examples, N−1 current sensors 250 are used and one of the phases (E.G., phase C) is not directly measured.

Figure 3:
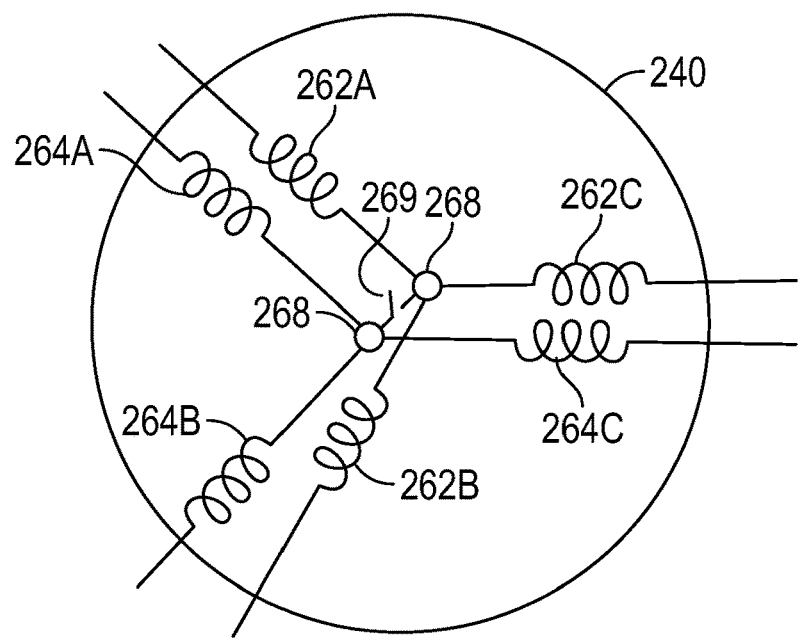
FIG. 3 schematically illustrates a phase winding of the electric motor of FIG. 1.
Figure 4:
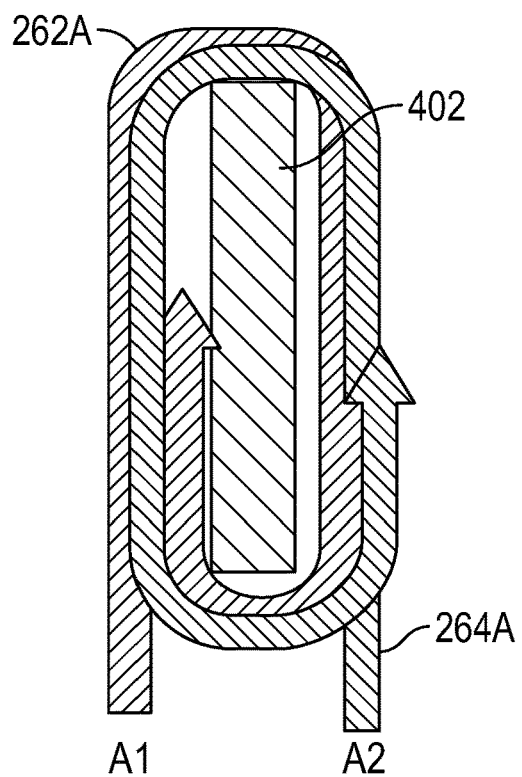
FIG. 4 schematically illustrates a cross section of the phase windings illustrated in FIG. 3.
Figure 5:
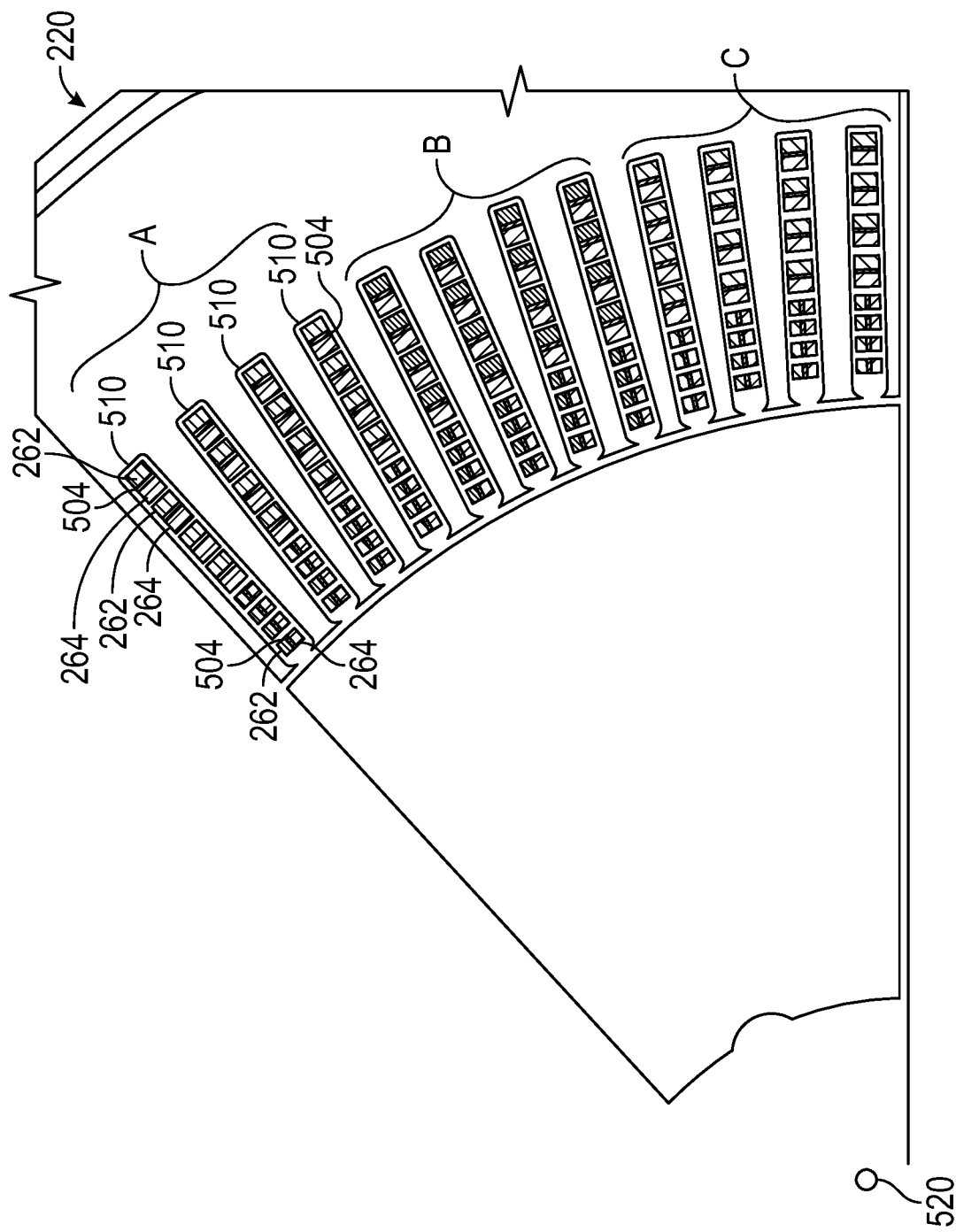
FIG. 5 schematically illustrates a sectional view of phase windings within the electric motor of FIGS. 1-4.

With continued reference to FIGS. 1 and 2, FIG. 3 schematically illustrates the motor 240 including windings 262A, 262B, 262C, 264A, 264B, 264C. Each of the windings in the first set 262 of windings is connected to the first set of output phases 222, and each winding in the second set 264 of is connected to the second set of output phases 224. In the illustrated example, each set of windings 262, 264 is arranged in a wye configuration with dual central neutral nodes 268 connecting one set of windings 262A, 262B, and 262C, and separately another set of windings 264A, 264B, and 264C. In some examples, the central neutral nodes 268 are electrically tied (connected) via a switch 269 or are electrically tied via a permanent connection. In alternate examples (not shown), the neutral node 268 of each set of windings 262, 264 can be electrically floating (unconnected) relative to each other. Tying the neutral nodes 268 together provides for improved balancing between the two sets of windings 262, 264. In examples where the connection is tied together via an actively controlled switch, the switch 269 provides finer control of the balancing and fault tolerance between phase windings 262, 264 and the switch 269 is controlled by the motor controller 230.

With continued reference to FIGS. 1-3, FIG. 4 schematically illustrates a cross section of two corresponding windings 262A, 264A. The illustration demonstrates the direction of current flow through the windings. The physical orientation of the windings 262A, 264A is parallel, and the windings 262A and 264A are wound around the same core 402 adjacent to each other. Current is passed through the windings 262A, 264A in opposite directions in an antiparallel configuration. Passing current through the adjacent windings in antiparallel allows the motor 240 to receive the full magnitude of the current output by the inverter 220 without the currents in each windings 262A, 264A providing opposing mechanical forces. Furthermore, the opposing electromagnetic fields provide full common mode (dv/dt) noise cancellation in the antiparallel configuration.

With continued reference to FIGS. 1-4, FIG. 5 schematically illustrates a sectional view of the motor 220. The sectional view includes windings 262, 264 disposed within winding slots 510 in the antiparallel configuration discussed herein. The illustrated example includes a portion of the antiparallel windings 262A disposed radially adjacent the corresponding windings (E.G., winding 262A is radially adjacent winding 264A). Antiparallel windings 262B, 262C, 264A, 264B, 264C are arranged similarly and depiction is omitted to avoid redundancy. As used herein "radially adjacent" windings refers to a set of windings where a first winding in the set is immediately radially inward of the other winding in the set.

In addition to the radially adjacent windings 262, 264, each slot 510 includes a portion of the antiparallel windings 262A circumferentially adjacent the corresponding antiparallel winding 262A. As used herein circumferentially adjacent windings 262, 264 refer to immediately adjacent windings placed at the same radial distance but offset circumferentially from each other about a center point 520 of the motor 240.

In the illustrated example, the circumferentially adjacent portions are outward of the radially adjacent portions. In alternate examples the positioning may be intermixed, alternated, or reversed to facilitate manufacturing of a specific motor 240. Splitting the windings within the slots 510 in adjacent positions, as shown for both the radial and the circumferentially adjacent windings provides reduced AC copper loss during high speed switching.

In some example motors 240 placing the sets of antiparallel windings in radial or circumferential adjacency with each other can generate excessive interwinding capacitance. The interwinding capacitance, in turn, generates current due to the change in voltage over time (dV/dt), and the generated current can be disadvantageous to motor operations. In order to reduce the interwinding capacitance an insulation sheet 504 is disposed between the adjacent turns of each set of winding 262, 264. The insulation sheet 504 is constructed of an electrically insulating material, and passively reduces an interwinding capacitance.

While the illustrated example includes turns in both radial adjacency and circumferential adjacency, it is appreciated that a practical embodiment may include windings configured within the slots 510 in either radial adjacency, circumferential adjacency, or both.

The configuration and operation described herein provides a simple to construct reversely coupled winding that allows for three-phase control of an electric motor using the full output of a dual output inverter to drive a single motor. Furthermore, the configuration can be adapted by one skilled in the art to motors utilizing any number of phases, such as six phase motors, and still fall within the teachings described herein.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An electric motor configuration comprising:
   a dual output multilevel inverter including a first set of alternating current (AC) phase outputs and a second set of multi-phase AC phase outputs with the first set of AC phase outputs providing a current, each phase output of the first set of AC phase outputs corresponding to a phase output of the second set of AC phase outputs, and wherein each phase output of the first set of AC phase outputs is offset from the corresponding phase output of the second set of phase outputs by 180 degrees;
   an electric motor including a first set of motor windings and a second set of motor windings configured anti-parallel to the first set of motor windings, the first set of motor windings being connected to the first set of AC phase outputs and the second set of motor windings being connected to the second set of AC phase outputs, and wherein the electric motor includes a mechanical rotation output; and
   wherein the first set of motor windings includes a first neutral node and the second set of motor windings includes a second neutral node, and wherein the first neutral node is connected to the second neutral node such that the first and second neutral node are electrically connected in at least one mode of operations, the at least one mode of operations including actively controlling balance and fault tolerance between windings of the first set of motor windings and windings of the second set of motor windings using an actively controlled switch.

2. The electric motor configuration of claim 1, wherein the dual output multilevel inverter is a high speed switching inverter.

3. The electric motor configuration of claim 1, wherein the electric motor includes a plurality of winding slots corresponding to each phase of the electric motor and wherein each winding slot includes windings from the first set of motor windings and windings from the second set of motor windings.

4. The electric motor configuration of claim 1, wherein the first and second neutral nodes are connected via an electrically controlled switch.

5. The electric motor configuration of claim 1, wherein the first neutral node is electrically floating relative to second neutral nodes.

6. The electric motor configuration of claim 1, further comprising a motor controller communicatively coupled to a plurality of current sensors, each current sensor in the plurality of current sensors being configured to detect a net current magnitude passing through a pair of corresponding phase outputs.

7. The electric motor configuration of claim 2, wherein the dual output multilevel inverter is a gallium nitride (GaN) switch based inverter.

8. The electric motor configuration of claim 3, wherein windings from the first set of motor windings and from the second set of motor windings in at least a subset of the plurality of winding slots are arranged in radial adjacency.

9. The electric motor configuration of claim 3, wherein windings from the first set of motor windings and windings from the second set of motor windings in at least a subset of the plurality of winding slots are arranged in circumferential adjacency.

10. The electric motor of claim 3, further comprising an electrically insulating sheet disposed between adjacent portions of the first set of windings and the second set of windings.

11. The electric motor configuration of claim 6, wherein the plurality of current sensors comprises N−1 Hall effect current sensors, where N is a total number of phases of the electric motor.

12. The electric motor configuration of claim 9, wherein windings from the first set of motor windings and from the second set of motor windings in at least a subset of the plurality of winding slots are arranged in radial adjacency.

13. A vehicle comprising:
   an electric energy storage system connected to a first electric motor via a first dual output multilevel inverter, wherein the electric energy storage system provides direct current (DC) power to the first dual output multilevel inverter;
   the first dual output multilevel inverter including a first set of alternating current (AC) phase outputs and a second set of multi-phase AC phase outputs with the first set of AC phase outputs providing a current, each phase output of the first set of AC phase outputs corresponding to a phase output of the second set of AC phase outputs, and wherein each phase output of the first set of AC phase outputs is offset from the corresponding phase output of the second set of phase outputs by 180 degrees;

the first electric motor including a first set of motor windings and a second set of motor windings configured antiparallel to the first set of motor windings, the first set of motor windings being connected to the first set of AC phase outputs and the second set of motor windings being connected to the second set of AC phase outputs, and wherein the first electric motor includes a mechanical rotation output; and wherein the first set of motor windings includes a first neutral node and the second set of motor windings includes a second neutral node, and wherein the first neutral node is connected to the second neutral node such that the first and second neutral node are electrically connected in at least one mode of operations, the at least one mode of operations including actively controlling balance and fault tolerance between windings of the first set of motor windings and windings of the second set of motor windings using an actively controlled switch.

14. The vehicle of claim 13, wherein the electric motor includes a plurality of winding slots corresponding to each phase of the electric motor and wherein each winding slot includes windings from the first set of motor windings and windings from the second set of motor windings.

15. The vehicle of claim 14, wherein windings from the first set of motor windings and from the second set of motor windings in at least a subset of the plurality of winding slots are arranged in radial adjacency.

16. The vehicle of claim 14, wherein windings from the first set of motor windings and windings from the second set of motor windings in at least a subset of the plurality of winding slots are arranged in circumferential adjacency.

17. The vehicle of claim 14, further comprising an electrically insulating sheet disposed between adjacent portions of the first set of windings and the second set of windings.

18. The vehicle of claim 16, wherein windings from the first set of motor windings and from the second set of motor windings in at least a subset of the plurality of winding slots are arranged in radial adjacency.

19. A method of operating an electric motor comprising:
providing a direct current (DC) power output from an energy storage system to a multilevel dual output inverter;
converting the DC power to a first set of alternating current phase outputs and a second set of alternating current phase outputs using the multilevel dual output inverter, wherein the first set of alternating current phase outputs includes a first plurality of phases, the second set of alternating current phase outputs includes a second plurality of phases, each phase in the first set of phase outputs corresponds with a phase in the second set of phase outputs, and each phase is offset from the corresponding phase by 180 degrees;
providing the first and second alternating current phase outputs to a single electric motor; and
passing current from each phase of the first set of alternating current phase outputs through a first set of motor windings and passing current from each phase of the second set of alternating current phase outputs through a second set of motor windings, wherein the first set of motor windings is arranged in antiparallel to the second set of motor windings, thereby generating a rotational output from the electric motor, and wherein the first set of motor windings includes a first neutral node and the second set of motor windings includes a second neutral node, and wherein the first neutral node is connected to the second neutral node such that the first and second neutral node are electrically connected in at least one mode of operations, the at least one mode of operations including actively controlling balance and fault tolerance between windings of the first set of motor windings and windings of the second set of motor windings using an actively controlled switch.

* * * * *